Sept. 2, 1958 MASAMICHI ENOMOTO 2,850,414

METHOD OF MAKING SINGLE CRYSTAL SEMI-CONDUCTOR ELEMENTS

Filed Dec. 21, 1955 3 Sheets-Sheet 1

INVENTOR.
MASAMICHI ENOMOTO
BY
Wenderoth, Lind & Ponack
Attys.

Sept. 2, 1958 MASAMICHI ENOMOTO 2,850,414

METHOD OF MAKING SINGLE CRYSTAL SEMI-CONDUCTOR ELEMENTS

Filed Dec. 21, 1955 3 Sheets-Sheet 2

INVENTOR.
MASAMICHI ENOMOTO
BY
Wenderoth, Lind & Ponack
Attys.

Sept. 2, 1958 MASAMICHI ENOMOTO 2,850,414

METHOD OF MAKING SINGLE CRYSTAL SEMI-CONDUCTOR ELEMENTS

Filed Dec. 21, 1955 3 Sheets-Sheet 3

INVENTOR.
MASAMICHI ENOMOTO
BY
Wenderoth, Lind + Ponack
Attys.

United States Patent Office 2,850,414

Patented Sept. 2, 1958

2,850,414

METHOD OF MAKING SINGLE CRYSTAL SEMI-CONDUCTOR ELEMENTS

Masamichi Enomoto, Mitaka-shi, Tokyo, Japan

Application December 21, 1955, Serial No. 554,448

Claims priority, application Japan June 20, 1955

5 Claims. (Cl. 148—1.6)

The present invention relates to an electric element having a semi-conductor for a transistor, a method of producing the same and an apparatus for producing the same.

A transistor having an element wherein a semi-conductor such as silicon or germanium together with a small amount of an impurity is applied to a base body.

The above-mentioned element used to be formed by crystal growth when the crystal kernels of a semi-conductor were deposited on a metal plate having a melting point higher than that of semi-conductor silicon or germanium or on a mica plate and said plate was dipped in a molten semi-conductor material. However, said conventional method has many defects that it is extremely difficult to control the temperature of the semi-conductor bath, that it is difficult to produce many elements having a uniform character and that the rate of production of elements having a semi-conductor crystal consisting of a single crystal is very low.

An object of the present invention is to provide a method whereby said elements having a semi-conductor for a transistor consisting of a single crystal and a favorably controlled predetermined amount of an impurity can be easily produced.

Another object of the present invention is to provide a method of and an apparatus for manufacturing transistors wherein all of said elements have a substantially uniform character and at the same time a high performance.

Still another object of the present invention is to provide an apparatus wherein said elements can be favorably produced.

According to the present invention, a semi-conductor, an impurity and heating devices therefor are placed all together in a sealed vessel which is made vacuum by exhausting air by means of a vacuum pump, said vacuum being approximately above $2\times10^{-5}$ mm. Hg. After the vessel is thus made vacuum, the semi-conductor material is evaporated by means of a heater or preferably an electric heater supporting said material. At this time, in the initial period of the heating operation, in order to prevent undesired impurities contained in the semi-conductor material and other parts from being evaporated together with said material and deposited on the base body, said base body is isolated from the evaporated vapor by means of a shutter. When the impurities have been evaporated, that is, when a temperature at which only the semi-conductor material evaporates has been reached, said shutter is removed and the vapor of the semi-conductor material is directed onto the surface of the base. When a predetermined amount of the material has been evaporated and a predetermined amount of the semi-conductor material has been deposited on the surface of the base, the passage of the vapor of the semi-conductor material is again interrupted by means of a shutter and supply of energy to the heater is suspended. It is to prevent the deposition due to evaporation by residual heat of the material which can not be controlled that, before the heater is stopped, a shutter is located in the evaporating passage and the deposition of said material on the base material is thereby interrupted.

After the semi-conductor material has been deposited on the base body as mentioned above, a heating device consisting of a tungsten filament supporting a specific impurity to be combined with the deposited semi-conductor is made to act and said impurity will evaporate. The vapor of said impurity will be deposited in the film of the previously deposited semi-conductor material. As a result, a structure having on the semi-conductor film a film of a predetermined amount of the impurity to be combined with said semi-conductor will be obtained. The layer of the films on the base body is cut into numerous rectangular zones having sides of proper lengths so that said structure may be formed into respective elements as final products after being taken out of the vessel.

The structures obtained as mentioned above are put into another sealed vessel and are placed on a heater installed in said vessel. Then, said vessel or container has air exhausted to the same degree of vacuum as is mentioned above and is now charged with an inert gas. While the gas is being fed, said elements are heated by a heater. The heating temperature is higher than the melting point of the semi-conductor. By being thus heated, the semi-conductor film having the impurity film and deposited on the base body will melt and coagulate on each zone and become many particles of a single crystal. When the semi-conductor film has thus coagulated into particles, the heating is stopped and the particles are gradually cooled while the inert gas is being still fed. After the cooling, an electrode or lead wire is welded to each element.

The material for said base body must have a melting point higher than that of the semi-conductor maerial. In fact, in the case that the semi-conductor material is germanium, the metal to be used should be molybdenum or silver and the insulating material to be used should be a mica, quartz or ceramic body. In case the semi-conductor is silicon, molybdenum will be suitable and a quartz or ceramic body may be used for the insulating material.

Silicon and germanium are specifically selected and used as semi-conductor materials. The impurities to be combined with these semi-conductor materials are selected from among the elements of 3 or 5 in valence because the valence of each of silicon and germanium is 4. Specifically, indium is used for the element of 3 in valence and arsenic is used for the element of 5 in valence.

As obvious from the above description, the present invention is characterized in that a vacuum evaporation system is utilized to deposit a semi-conductor on the base plate or base body and undesirable and unnecessary materials evaporated at low temperatures are prevented by a shutter from being deposited on the surface of the base body so that a predetermined amount of a desired material may evaporate.

The present invention is further characterized in that, as the impurity to be deposited on the semi-conductor is evaporated also in a vacuum atmosphere, a predetermined amount of the impurity will be exactly evaporated and deposited.

The present invention is still further characterized in that the film structure consisting of two layers wherein the impurity film is thus formed on the semi-conductor film is divided into small rectangular zones, the base plate is left as it is and is not divided in this case and then a single crystalized body consisting of the semi-conductor material is produced by aggregation from the film structure by heating.

Now the present invention shall be explained with reference to the drawings by taking a transistor as an example.

Figure 2:
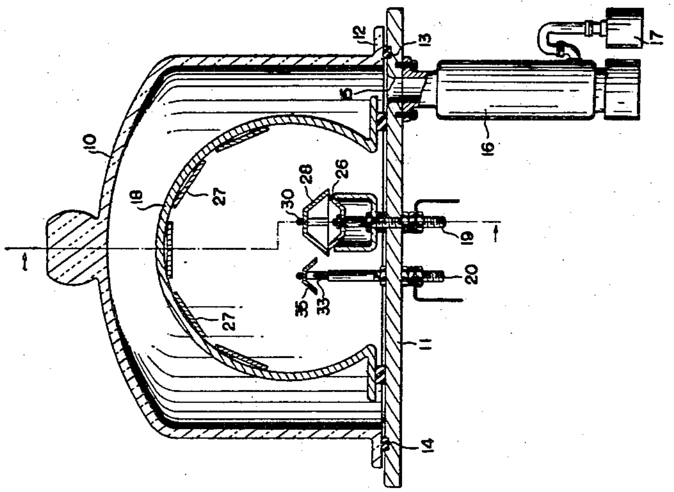
Figs. 1 and 2 are sectional views showing an apparatus for the vacuum evaporation operation according to the present invention.
Figure 1:
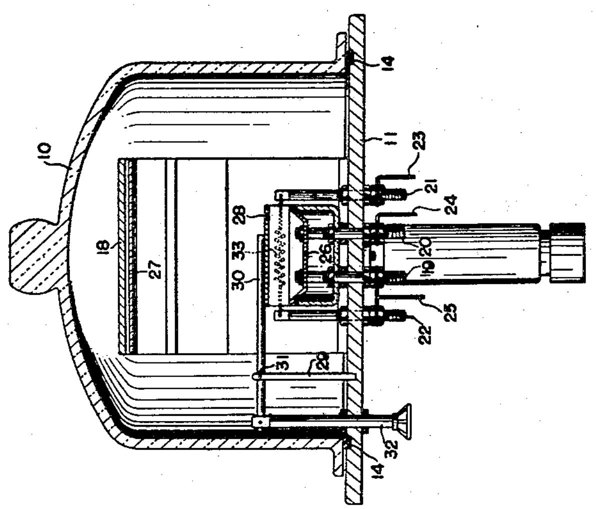

In Figs. 1 and 2, a bell-shaped vessel 10 formed of glass or any other proper material is mounted on a bottom plate 11 connected thereto with air-tight sealing between. Said air-tight sealing is accomplished by the close contact of the under surface of an outside flange 12 formed in the lower end portion of the vessel 10 with the upper surface of a ring made of an elastic material such as rubber inserted in a groove 13 in the bottom plate 11. An opening 15 is formed in said bottom plate 11 close to the peripheral portion of the vessel 10. An oil or mercury-diffusion pump 16 is connected in alignment with said opening 15 and is further connected with a rotary pump 17. The vessel 10 is sucked by both of said pumps to a vacuum degree of about $2\times10^{-5}$ mm. Hg. A channel-shaped support 18 made of a metal which is not easy to fuse such as, for example, molybdenum is mounted on the part of said bottom plate 11 within the vessel 10. Two pairs of supporting posts 19 and 20 and 21 and 22 made of such metal as copper and extending into the vessel 10 air-tightly through said plate 11 are fixed to said part of the base plate 11. Lead wires 23, 24 and 25 connected respectively to suitable electric sources are connected to the respective parts of said posts projecting out of the bottom plate 11. A pair of posts 19 and 20 carry at their upper ends a dish 26 made of a hardly fusible metal such as molybdenum. A piece of a predetermined amount of a semi-conductor material such as, for example, germanium is placed on said dish. This dish itself becomes a heater, generates heat due to its own resistance to the electric current through lead wires 24 and 25 and heats the germanium placed thereon to a temperature of 2000 to 2400° C.

Undesired impurities which evaporate in the initial period of the aforesaid heating operation and can be evaporated at low temperatures evaporate in this apparatus. Therefore, a shutter 28 covering the dish 26 is so arranged as to prevent the undesired impurities from spreading and being deposited on the base bodies of the transistor supported within the supporting member 18. Said covering shutter 28 is fixed to one end portion of a lever 30 supported pivotaly in the upper part of a stud 29 on the bottom plate 11. Said lever 30 is pivoted to an operating rod 32 at the end opposite the covering shutter with respect to the pivot point 31. Said operating rod 32 extends to the outside of the bottom plate 11 air-tightly through the plate. As said rod 32 is to be reciprocated vertically up and down by an operator, it must be kept well air-tight with respect to the base plate 11. When said rod 32 is pulled downward below the illustrated position by the operator, the lever 30 will rotate anticlockwise around the pivot point 31 as the center and the covering shutter 28 fixed to the other end of said lever 30 will be moved out of the support 18. In this state, the germanium metal on the dish 26 can freely get onto the base bodies 27 attached to the inside wall of the support 18. Therefore, a thin film of germanium will be deposited on the base bodies 27.

Further a coiled tungsten filament 33 is bridged between the upper end parts of the other pair of posts 21 and 22 of said two pairs on the bottom plate 11. Lead wires 23 and 25 connected to suitable electric sources are connected to the respective posts 21 and 22. Therefore, when said filament 33 is energized by an electric current, it will be heated incandescently. Arsenic (or indium) which is an impurity material to be combined with semi-conductor material germanium is inserted in the coiled part of said filament 33.

Figure 3:
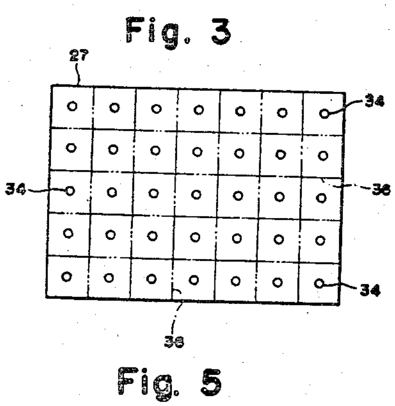
Fig. 3 is a plan view showing the base body of a transistor according to the present invention.

The base body 27 on which germanium as a semiconductor material is to be deposited is made of a thin metal sheet, such as of silver or molybdenum, having a melting point higher than that of germanium. The base body 27 has numerous small recesses 34 of a diameter of less than 1 mm. formed at intervals of about 3 mm. on the surface by such means as punching as shown in Fig. 3. Such base bodies 27 are attached as arranged to the inside wall of the support 18 provided on the bottom plate of said apparatus. At the same time, a small piece of arsenic or indium as an impurity material is inserted in the coiled filament. Said arsenic piece is so prepared as to be in an amount determined against the total area of the base bodies attached to the support 18. A covering shutter 35 the same as mentioned above for germanium is provided above said coiled filament and is operated by means of an operating rod extending out of the vessel through the bottom plate 11 just as mentioned above.

As mentioned above, the base bodies 27 are attached to the inside surface of the supporting member 18. The germanium piece is laid on the dish 26. The impurity piece is inserted in the coiled filament 33. Then the vessel 10 is placed on the bottom plate 11 through the elastic ring 14. The rotary pump 17 thus starts rotation. When the pressure in said vessel has been evacuated to about $2\times10^{-5}$ mm. Hg column as measured by a proper vacuum meter such as, for example, the MacLeod gauge, the lead wires 24 and 25 are connected to the respective electric source circuits (not illustrated) and the dish 26 is thereby heated. In the initial period of said heating, the covering shutter 28 will prevent the impurities projecting before the dish 26 arrives at a sufficiently high temperature, for example, of about 2400° C. from reaching the base bodies 27. When the temperature has risen high enough, the operating rod 32 is pulled by the operator and the covering shutter 28 will be thereby removed out of the projection path of the germanium vapor. At this moment, the vapor of germanium will reach the base bodies 27 and will be deposited thereon. When the evaporation of a predetermined amount of germanium has been completed, the covering shutter 28 is again returned to the covering position. At this time, if necessary, it is confirmed that the pressure within the vessel is again about $2\times10^{-5}$ mm. Hg. Then, electric energy is applied to the filament 33 through the lead wires 23 and 25 and the filament 33 will be thereby incandesced. In this case, the covering shutter 35 is placed above the filament 33 in the initial period of the heating operation to accurately control the amount of evaporation of the arsenic or indium inserted in the filament coil 33. Then said covering shutter 35 is removed from above the filament 33 and arsenic or indium vapor will be deposited on the prior deposited germanium film. In order to make the amount of said deposition accurate as mentioned above, the covering shutter 35 is again closed after the elapse of a predetermined time.

When germanium as a semi-conductor material has been deposited on the base bodies 27 as in the above and then an impurity, for example arsenic, to be combined therewith has been deposited thereon, air is introduced into the vessel, the bell-shaped member 10 is removed from the surface of the bottom plate 11 and each base body is disengaged from the supporting member 18. A cut is made midway between the respective recesses 34 in the deposit layer of each base body thus taken out as shown by numerous chain lines 36 in Fig. 1. Such cuts are formed in the deposited film layer only, the base body remaining as it is. Thus, many rectangular deposit layers will exist independently from one another on the base body. They are next subjected to an aggregating treatment.

Figure 4:
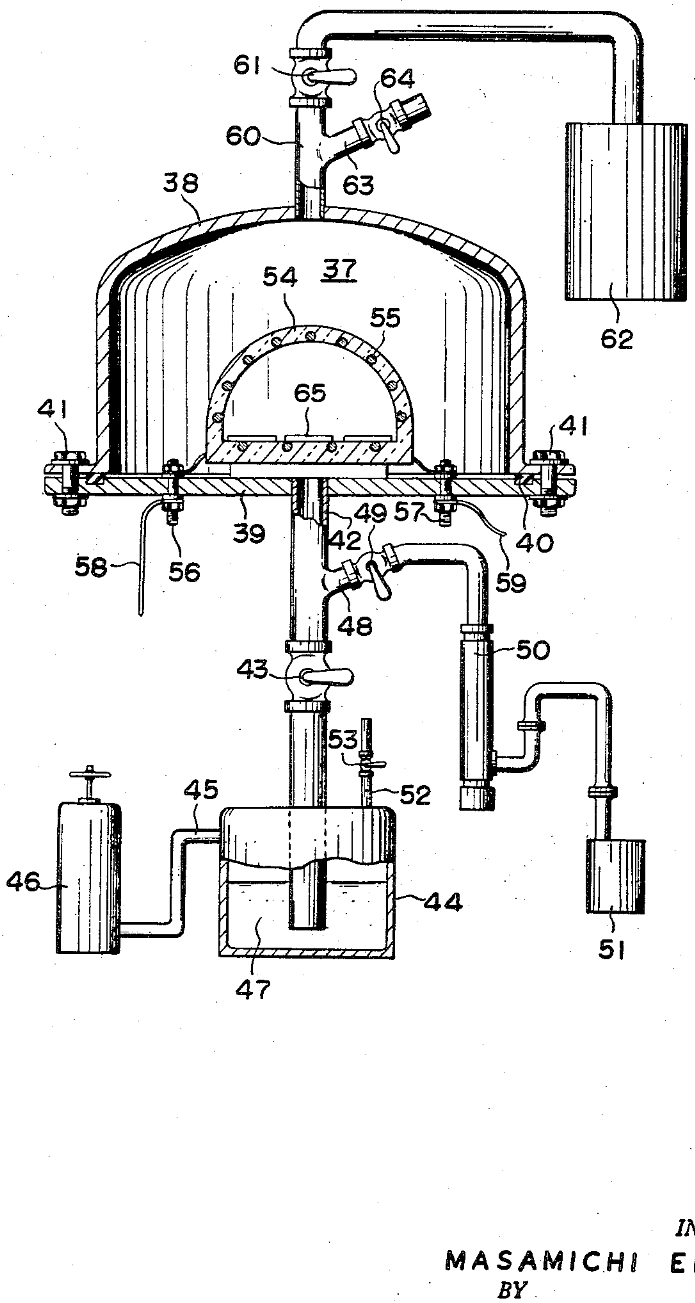
Fig. 4 is a sectional view showing a heating apparatus for aggregating element layers after they are deposited on the base body.

The aggregating treatment is carried out the same as the depositing treatment, while preventing oxidation, in the presence of an inert gas within a sealed vessel whose interior can be isolated from the atmosphere. A vessel 37 is formed by mounting a bell-shaped shell 38 made of heat-resisting glass or metal on a bottom plate 39 with a sealing ring 40 made of an elastic material such as, for example, a heat-resisting synthetic rubber-like material inserted between. The shell 38 is fixed gas-tightly to the surface of the bottom plate by means of bolts and nuts 41. However, it is needless to say that the shell 38 is made free to be removed from the bottom plate in order to put said deposited base bodies into or out of the vessel. A conduit 42 to connect the interior of the vessel with a vacuum pump system and a compressor is fixed to the center of the bottom plate 39. Said conduit 42 is provided with a cock 43 and is inserted at the lower end into mercury in a mercury tank 44. The part adjacent to the ceiling of said mercury tank 44 is connected to a compressor 46 through a pipe 45 so that compressed air may press the upper surface of the mercury. In Fig. 4, the mercury tank 44 is shown smaller than in fact as compared with the vessel 37 for the sake of convenience.

Said conduit 42 has a branch pipe 48 between the bottom plate 39 and the cock 43. This branch pipe 48 is connected with a diffusion pump 50 which is connected further to a rotary pump 51. A compressed air exhausting pipe 52 is fixed to the ceiling of said mercury tank 44 and is provided with a cock 53.

A hollow semi-circular heating furnace 54 is placed on the bottom plate 39. Said heating furnace 54 is formed of a quartz article. Electric heating coils 55 are embedded in the peripheral wall and bottom wall of the furnace. Studs 56 and 57 are passed through and engaged air-tightly with the bottom plate 39. Both ends of said heating coil 55 are respectively connected to the parts of said studs 56 and 57 projecting from the plate 39 within the vessel 37. Lead wires 58 and 59 are connected respectively to said studs 56 and 57 connected to a suitable electric source.

An inert gas introducing conduit 60 is fixed to the upper part of the bell-shaped shell 38 and is connected to an inert gas source 62 through a cock 61. An air introducing pipe 63 is formed on the conduit 60 between the cock 61 and the shell 38 and is provided with a cock 64.

Composite structures in each of which a semi-conductor germanium film layer and an impurity (arsenic or indium) film layer combined therewith are deposited on a base body consisting of a molybdenum plate as mentioned above are arranged on the bottom wall of said furnace made of quartz for their second treatment. Then the shell 38 is placed on the bottom plate 39 and is air-tightly fixed to the bottom plate 39 by means of the bolts and nuts. In this state, the air within the vessel is drawn by means of the diffusion pump 50 and rotary pump 51 and the vessel is thus made vacuum. The degree of this vacuum is about $2\times10^{-5}$ mm. Hg or higher. In this vacuum operation, the cock 61 is closed so that no inert gas may enter the vessel and the cock 64 is also closed to isolate the vessel from the atmosphere. Needless to say, in this case, the cocks 43 and 53 are also closed and only the cock 49 connecting the vessel to the pump system remains open.

When the vacuum within the vessel 37 has become about $2\times10^{-5}$ mm. Hg or higher, the cock 49 is closed and the communication between the interior of the vessel and the pump system will be interrupted. Then the cock 61 is opened and the vessel will be filled with the inert gas from the source 62. For the inert gas, neon, argon, hydrogen, nitrogen or carbon dioxide may be selectively used however, hydrogen is so dangerous that it is not suitable for the apparatus illustrated in the accompanying drawings. When the vessel has been filled with the inert gas, an electric current is passed through the heating coil 55 and the furnace 54 will be heated. The heating temperature should be higher than the melting point of 958.5° C. of the germanium of the semi-conductor film, that is to say, the temperature of the furnace body should be about 960 to 1420° C.

When heated as mentioned above, the germanium deposited on the base body will melt, will aggregate in the recess of each zone and will thus become beads in the recesses. After the elapse of a small time such as, for example, 30 to 600 seconds after said aggregation, the electric current through the heating coil 55 is cut off. The beads of germanium are then left for about 20 to 30 hours as they are, for gradually cooling. The temperature within the vessel is made at least below 150° C. During said heating and gradually cooling, the germanium in the state of beads will develop to be a single crystal. The crystallization to said single crystal will occur in the same state in all the pieces placed in the heating furnace. Therefore, all the respective germanium films will get the same characters. This is one of the very great features of the present invention.

The composite bodies to which curing for about 24 hours have been applied after heating as mentioned above will be of the semi-conductor including the impurity and deposited in the form of numerous beads arranged at equal intervals on the base body. All the beads will be of a single crystal. When the temperature within the vessel has become less than 150° C. as a result of said cooling, compressor 46 is driven and compressed air will be fed to the upper surface of the mercury 47 in the mercury tank 44. Cock 43 is opened and the mercury will rise through the conduit 42, will enter the vessel 37 and will drive out the inert gas occupying the interior of the vessel into the source 62 through the opened cock 61.

When the inert gas within the vessel 37 has been driven out by the mercury, the cock 61 is closed, the compressor is stopped and the cocks 53 and 64 are opened. Therefore, the interior of the mercury tank 44 will communicate with the atmosphere and the mercury which has risen into the vessel 37 will descend back into the tank 44. Then the cocks 43 and 53 are closed. As the cock 64 remains open, air will come into the vessel 37 and the pressure within the vessel 37 will become equal to the atmospheric pressure. Therefore, the bolts and nuts 41 are disengaged, the bell-shaped shell 38 is removed from the surface of the bottom plate 39, the composite bodies in the furnace 54 are taken out and each base body is cut into many transistor elements each of which has in the center an aggregated semi-conductor bead having the impurity. It is as usual that electrodes, emitters and collectors are welded to the respective elements to obtain final products as transistors.

The above has been described of a transistor element obtained by depositing germanium as a semi-conductor material together with a small amount of arsenic as an impurity on a molybdenum plate and then aggregation both of said composite elements into a single particle-shaped crystal. Now, a method of making a junction-type transistor according to the present invention shall be described in the following.

In a junction-type transistor, variable impurities are joined alternately with each other on a semi-conductor film. It has hitherto been deemed very difficult to manufacture transistors of said type. Further, it has been impossible to produce on a mass-production scale numerous junction-type transistors of the same character. The present invention solves those problems. Said transistors can be produced by the same method and apparatus as have been described above.

N-type and P-type elements are alternately jointed and arranged in a junction type transistor. Said arrangement may be either N-P-N or P-N-P. The N-type element is a combination of a semi-conductor material of 4 in valence and an element of 5 in valence. The P-type element is a combination of a semi-conductor material of 4 in valence and an element of 5 in valence. The P-type element is a combination of the semi-conductor material and an element of 3 in valence.

Figure 5:
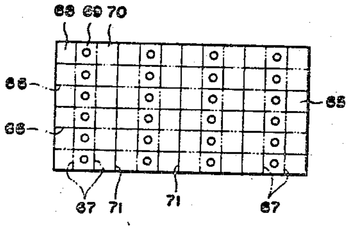
Fig. 5 is a plan view of the base body of a composite type transistor showing said body as divided into respective element zones.
Figure 6:
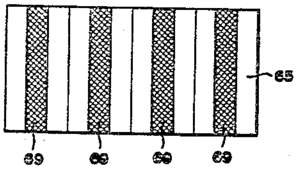
Figs. 6 and 7 are plan views showing the base body shown in Fig. 5 as fitted thereon with masks defining depositing zones.

The surface of a base sheet 65 made of a heat-proof and electrically insulative material is sectioned into many zones with numerous lateral and vertical lines 66 and 67 which may be imaginary. (See Fig. 5.) In this Fig. 5, vertically extending bands 68, 69 and 70 as sectioned by the vertical lines 67 are N-type, P-type and N-type zones, respectively, from left to right. The order of the respective zones are repeated in turn from left to right to form a pattern such as is shown in Fig. 6.

First of all, a semi-conductor material is deposited over-all on the base sheet 65 sectioned into such zones. Then, only the P-type zones are masked. Thus masked base sheet 65 is fixed to the supporting member 18 of the same apparatus as is shown in Figs. 1 and 2. Arsenic of 5 in valence as an N-type impurity is placed in the filament coil 33 and the vessel is made vacuum. Then the substance evaporating at low temperatures is first prevented by the covering shutter 35 just as mentioned above from being deposited on the base sheet 65. When the temperature of the heated zone has become high enough, the covering shutter 35 is removed from the path of the evaporation vapor and the impurity will be deposited on the unmasked parts of the base sheet.

Figure 7:
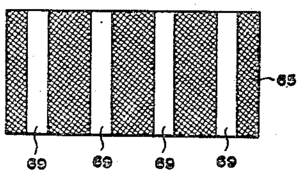

When the N-type deposited film has been formed as mentioned above, said N-type film is masked and the first masked zones are now unmasked as shown in Fig. 7. The base sheet is again put into the vacuum vessel and indium as a P-type impurity will be thereby deposited on the P-type zones. The layer wherein the N-type and P-type films are thus alternately deposited has cuts made along the lines 66 and 67 in Fig. 5 and is divided into numerous junction type elements each having an N-P-N arrangement.

The base sheet having the elements of the junction-type as divided as mentioned above is subjected to the aggregation of layers by the apparatus illustrated in Fig. 4. A small recess is formed in advance in the center of each N-P-N zone, that is, in the center of each P-zone so that said aggregation may take place in the central portion of each element zone on the sheet. The N-type and P-type layers in each element zone will aggregate in said recess and an N-P-N type transistor of the junction-type will be obtained.

In the case of a P-N-P type transistor of the junction-type, the above mentioned procedures are reversed. That is to say, first of all, the P-zone is exposed and the N-zone is masked. When a P-type film has been deposited, said P-type film is masked and then an N-type film will be deposited. When a P-N-P type element has been thus formed, the sheet is subjected to aggregation in the apparatus illustrated in Fig. 4, is thus made a P-N-P type transistor and is then cut into respective elements along the lines 66 and 67 in Fig. 5.

The present invention has just been explained in the above with reference to the three examples. Alternatively silicon can also be used as a semi-conductor material. Mica or ceramics can also be used for the base sheet in the composite type. It is needless to say that the apparatus according to the present invention can be variously modified within the scope of the present invention.

I claim:

1. A method of producing a semi-conductor element of a transistor, comprising preparing a base plate having a plurality of spaced small recesses in one surface of said plate, placing said base plate, a quantity of semi-conductor material and a quantity of impurity material in a vacuum, heating said semi-conductor material to evaporate it, depositing the evaporated semi-conductor material in a film on said base plate, beating said impurity material to evaporate it, depositing the evaporated impurity material in a film on said film of semi-conductor material, removing said base plate having said films of deposited semi-conductor material and impurity material from said vacuum, cutting both of said films between said recesses to form a plurality of isolated areas on said plate, heating said plate with said isolated areas of films in a vacuum, whereby the films of each area are fused together and aggregated into a single crystal one in each of said recesses, and cutting said plate into separate units, each of said units having said single crystal in said recess.

2. A method of producing an element having a semi-conductor material according to claim 1 wherein the semi-conductor material is germanium and the impurity material is arsenic.

3. A method of producing an element having a semi-conductor material according to claim 1 wherein the semi-conductor material is germanium and the impurity material is indium.

4. A method of producing an element having a semi-conductor material according to claim 1 wherein the semi-conductor material is silicon and the impurity material is arsenic.

5. A method of producing an element having a semi-conductor material according to claim 1 wherein the semi-conductor material is silicon and the impurity material is indium.

References Cited in the file of this patent

UNITED STATES PATENTS

| | | |
|---|---|---|
| 2,635,579 | Chadsey Jr. | Apr. 21, 1953 |
| 2,692,839 | Christensen et al. | Oct. 26, 1954 |
| 2,727,839 | Sparks | Dec. 20, 1955 |
| 2,730,986 | Patton | Jan. 17, 1956 |
| 2,780,569 | Hewlett | Feb. 5, 1957 |

FOREIGN PATENTS

| | | |
|---|---|---|
| 514,927 | Belgium | Nov. 14, 1952 |